(12) United States Patent
Christiano et al.

(10) Patent No.: US 11,173,644 B2
(45) Date of Patent: Nov. 16, 2021

(54) CASTING APPARATUS FOR MANUFACTURING POLYMER FILM

(71) Applicant: Davis-Standard, LLC, Pawcatuck, CT (US)

(72) Inventors: John P. Christiano, Old Lyme, CT (US); Edward J. Smith, Frenchtown, NJ (US); Andrew A. Merckel, Mystic, CT (US)

(73) Assignee: Davis-Standard, LLC, Pawcatuck, CT (US)

( * ) Notice: Subject to any disclaimer, the term of this patent is extended or adjusted under 35 U.S.C. 154(b) by 168 days.

(21) Appl. No.: 16/141,279

(22) Filed: Sep. 25, 2018

(65) Prior Publication Data

US 2019/0091917 A1 Mar. 28, 2019

Related U.S. Application Data

(60) Provisional application No. 62/563,411, filed on Sep. 26, 2017.

(51) Int. Cl.
*B29C 48/88* (2019.01)
*B29C 39/14* (2006.01)
(Continued)

(52) U.S. Cl.
CPC ............ *B29C 48/914* (2019.02); *B29C 39/14* (2013.01); *B29C 48/08* (2019.02); *B29C 48/142* (2019.02);
(Continued)

(58) Field of Classification Search
CPC ..... B29C 48/914; B29C 48/08; B29C 48/142; B29C 39/14; B29L 2007/008
See application file for complete search history.

(56) References Cited

U.S. PATENT DOCUMENTS 3,581,340 A 6/1971 Thieme
3,964,848 A 6/1976 Wockener
(Continued)

FOREIGN PATENT DOCUMENTS

CN 103347678 A 10/2013
CN 205763584 U 12/2016
(Continued)

OTHER PUBLICATIONS

Battenfield-Cincinnati ("Next Generation" extruder series: higher efficiency and more flexibility, press release, Nov. 2016) (Year: 2016).*

(Continued)

*Primary Examiner* — Yung-Sheng M Tsui
(74) *Attorney, Agent, or Firm* — Murtha Cullina LLP (57) ABSTRACT

A casting apparatus for manufacturing polymer film includes a die for discharging a molten polymer and having discharge direction oriented at a discharge angle offset from horizontal. The apparatus includes a first chill roll having a first diameter and a second chill roll having a second greater diameter. There is a first gap between the first chill roll and the second chill roll. The discharge angle is of a predetermined magnitude to gravity assist delivery of the molten polymer to the first gap. The second chill roll is positioned to gravity support the film exiting the first gap along a first length of a first side of the film. A first polishing roll is positioned downstream first and second chill rolls. The first polishing roll engages and cools a second length of a second opposite side of the film. The first length is substantially equal to the second length.

34 Claims, 8 Drawing Sheets

(51) Int. Cl.
    *B29C 48/08*   (2019.01)
    *B29C 48/14*   (2019.01)
    B29L 7/00      (2006.01)
    B29C 48/10     (2019.01)

(52) U.S. Cl.
    CPC .......... *B29C 48/10* (2019.02); *B29L 2007/008* (2013.01)

(56) References Cited

U.S. PATENT DOCUMENTS

| | | | |
|---|---|---|---|
| 4,014,636 A | 3/1977 | Pawelczyk | |
| 4,038,012 A | 7/1977 | Sander | |
| 4,056,592 A | 11/1977 | Izumi et al. | |
| 4,066,729 A | 1/1978 | Van Cappellen | |
| 4,105,386 A | 8/1978 | Thiel et al. | |
| 4,110,387 A | 8/1978 | Wöckener et al. | |
| 4,214,857 A | 7/1980 | Wockener et al. | |
| 4,311,658 A | 1/1982 | Nicoll | |
| 4,408,974 A | 10/1983 | Comerio | |
| 4,477,407 A | 10/1984 | Hetherington et al. | |
| 4,655,703 A | 4/1987 | Heise | |
| 4,695,239 A | 9/1987 | Klepsch et al. | |
| 4,734,229 A | 3/1988 | Johnson et al. | |
| 5,087,191 A | 2/1992 | Heise et al. | |
| 5,262,101 A | 11/1993 | Yagi et al. | |
| 5,397,526 A | 3/1995 | Perkins et al. | |
| 5,423,671 A | 6/1995 | Imataki | |
| 5,425,959 A | 6/1995 | Manser | |
| 5,464,363 A | 11/1995 | Schulz | |
| 5,466,403 A | 11/1995 | Nissel | |
| 5,695,698 A | 12/1997 | Ajji et al. | |
| 5,868,983 A | 2/1999 | Vogl et al. | |
| 5,885,522 A | 3/1999 | Giannini et al. | |
| 5,912,026 A | 6/1999 | Gokeen et al. | |
| 6,045,349 A | 4/2000 | Ishida et al. | |
| 6,071,110 A | 6/2000 | Mikkelsen | |
| 6,187,422 B1 | 2/2001 | Murschall et al. | |
| 6,250,904 B1 | 6/2001 | Reddy et al. | |
| 6,254,712 B1 | 7/2001 | Enlow et al. | |
| 6,403,005 B1 | 6/2002 | Mientus et al. | |
| 6,406,285 B1 | 6/2002 | Nissel | |
| 6,575,726 B1 * | 6/2003 | Nissel | B29C 43/24 425/327 |
| 6,773,649 B2 | 8/2004 | Bourne et al. | |
| 6,913,714 B2 | 7/2005 | Liu et al. | |
| 6,991,758 B2 | 1/2006 | Krumm et al. | |
| 7,165,962 B2 | 1/2007 | Hanson | |
| 7,442,332 B2 | 10/2008 | Cancio et al. | |
| 7,803,292 B2 | 9/2010 | Heki | |
| 8,262,966 B2 | 9/2012 | Becker et al. | |
| 9,616,606 B2 | 4/2017 | Roth | |
| 2002/0074691 A1 | 6/2002 | Mortellite et al. | |
| 2004/0104496 A1 | 6/2004 | Arai et al. | |
| 2005/0263939 A1 | 12/2005 | Krampf et al. | |
| 2006/0131779 A1 | 6/2006 | Kagawa | |
| 2006/0244174 A1 | 11/2006 | St. Denis et al. | |
| 2006/0260484 A1 * | 11/2006 | Mizunuma | B29C 48/08 101/216 |
| 2007/0267773 A1 | 11/2007 | Kishimoto et al. | |
| 2008/0034986 A1 | 2/2008 | Lucas et al. | |
| 2009/0169772 A1 | 7/2009 | Yamada et al. | |
| 2009/0261500 A1 | 10/2009 | Ueda | |
| 2010/0109180 A1 | 5/2010 | Becker et al. | |
| 2011/0201746 A1 | 8/2011 | Ishiguro et al. | |
| 2013/0307179 A1 | 11/2013 | Roth | |

FOREIGN PATENT DOCUMENTS

| | | |
|---|---|---|
| CN | 105598334 B | 12/2017 |
| DE | 1957708 A1 | 5/1971 |
| DE | 3229477 A1 | 2/1984 |
| DE | 3239467 A1 | 4/1984 |
| DE | 3521331 A1 | 1/1986 |
| DE | 19544988 A1 | 6/1997 |
| DE | 29722223 U1 | 2/1998 |
| DE | 19961743 A1 | 7/2001 |
| DE | 102005006412 A1 | 8/2006 |
| DE | 102006012417 A1 | 9/2007 |
| DE | 102011003604 A1 | 8/2012 |
| EP | 0061385 A1 | 9/1982 |
| EP | 0325706 A2 | 8/1989 |
| EP | 0335108 A2 | 10/1989 |
| EP | 0466460 A2 | 1/1992 |
| EP | 0759350 A1 | 2/1997 |
| EP | 1600277 A2 | 11/2005 |
| EP | 2184156 A2 | 5/2010 |
| EP | 1424184 B1 | 5/2011 |
| EP | 2431153 A2 | 3/2012 |
| GB | 1316758 | 5/1973 |
| GB | 1318274 | 5/1973 |
| GB | 1371085 | 10/1974 |
| GB | 1394790 | 5/1975 |
| GB | 1424499 | 2/1976 |
| GB | 1465648 | 2/1977 |
| JP | S63197614 A | 8/1988 |
| JP | H05253962 A | 10/1993 |
| JP | H05309679 A | 11/1993 |
| JP | H08230018 A | 9/1996 |
| JP | H09155951 A | 6/1997 |
| JP | 2781836 B2 | 7/1998 |
| JP | 200043071 A | 2/2000 |
| JP | 3227897 B2 | 9/2001 |
| JP | 3250578 B2 | 11/2001 |
| JP | 2002347052 A | 12/2002 |
| JP | 2003236869 A | 8/2003 |
| JP | 2004050690 A | 2/2004 |
| JP | 3846566 B2 | 9/2006 |
| JP | 3968879 B2 | 6/2007 |
| JP | 2008056890 A | 3/2008 |
| JP | 4183336 B2 | 9/2008 |
| JP | 4396698 B2 | 10/2009 |
| WO | 3802095 A1 | 8/1989 |
| WO | 9638287 A1 | 12/1996 |
| WO | 9734759 A3 | 9/1997 |
| WO | 9850222 A1 | 11/1998 |
| WO | WO1998050222 A1 * | 11/1998 |
| WO | 2004096894 A2 | 11/2004 |
| WO | 2010035900 A1 | 4/2010 |
| WO | 2011129257 A1 | 10/2011 |
| WO | 2011129259 A1 | 10/2011 |
| WO | 2012133196 A1 | 10/2012 |

OTHER PUBLICATIONS

Neal Gigliotti; Plastic Processing—Better gap control improves quality and speed; Hydraulics & Pneumatics, pp. 28-30, (May 2007).

Paul R. Lamont; Equipment and Processing Considerations for Thin Gauge PP Sheet; Journal of Plastic Film & Sheeting 14.3: pp. 256-267. Technomic Publ Co Inc. (Jul. 1998).

Gerry Sposato; Multiple All Nipping Rollstands, http://hpmamerica.com/menu-header/innovations/popup/rollsheet.html (last visited May 19, 2009).

Stephen J. Gust; Calendering is still King for High-Volume PVC Sheet; Plastics Engineering: pp. 29-32. (Jan. 1987).

Intelligent Hydraulics; Fluid Power Journal—Sep./Oct. 2010, pp. 20-21, available at http://fluidpowerjournal.com.

PowerPoint Presentation Publicly given to people of ordinary skill in the art regarding a prior art calendar assembly and details regarding creation and edit dates of the electronic file to establish public disclosure on or before Feb. 1, 2001.

Sample Public Offer for Sale dated Mar. 7, 2001 of a relevant prior art polymer sheet system to Compression Polymer Corporation/Scranton Products.

Letter from Roger S. Clarke of sample public offer for sale and detailed disclosure of a relevant prior art roll stand, created in 2006.

* cited by examiner

CASTING APPARATUS FOR MANUFACTURING POLYMER FILM

FIELD OF THE INVENTION

The present invention relates generally to a casting apparatus for manufacturing polymer film and more particularly to a cooling and polishing apparatus that has a non-zero die discharge angle, a chill roll positioned to gravity support the polymer film and chill rolls and polishing rolls that uniformly cool a common length of opposite sides of the polymer film.

BACKGROUND OF THE INVENTION

There are various devices and processes for manufacturing polymer film, including blown film and chill roll casting. In the blown film method, the melt is extruded through an annular die to form a bubble expanded with internal air pressure. The bubble is then sized and air cooled with an air ring, internal bubble cooling and a sizing cage. The bubble is then collapsed, thereby forming a double ply film that can be processed.

In the casting of polymer films, a molten polymer can be extruded through a wide thin slot known as a die to form a melt curtain which is then quenched on one or more chill rolls that have an internally cooled roller or drum. The chill rolls are driven by a suitable drive system to control the speed of the chill rolls. There is a gap between adjacent pairs of rolls that is commonly referred to as a nip. The gap or nip (or air knife or vacuum box) is used to precisely control and establish the thickness of the polymer film and to ensure a uniform finish is obtained on the polymer film. The polymer films can consist of one or more layers and can have a thickness of between 6 and 2000 microns (0.24 to 80 mil, 1 mil=0.001 inches). The molten polymer gradually solidifies as it passes over the chill rolls as heat is transferred from the polymer film to the chill rolls.

There are many chill roll configurations that employ various sizes (e.g., various diameters) and numbers of pairs of rolls with each pair of rollers having a nip. Chill roll configurations generally include an initial pair of chill rolls that receive the molten polymer from the die. The chill roll configurations typically include a polishing stack that includes several chill rolls that are located downstream of the initial pair of chill rolls. The molten polymer film progressively solidifies as it makes contact with the initial pair of chill rolls and the chill rolls in the polishing stack. The polymer film is directed around the chill rolls such that a first side of the polymer film is in contact with an exterior surface of and cooled by one of the initial pair of chill rolls and a second side (i.e., opposite to the first side) is in contact with an exterior surface of and cooled by one of a first pair of chill rolls in the polishing stack, immediately downstream of the initial pair of chill rolls. The polymer film is directed around subsequent chill rolls such that the first and second sides of the polymer film are alternately cooled.

Figure 1A:
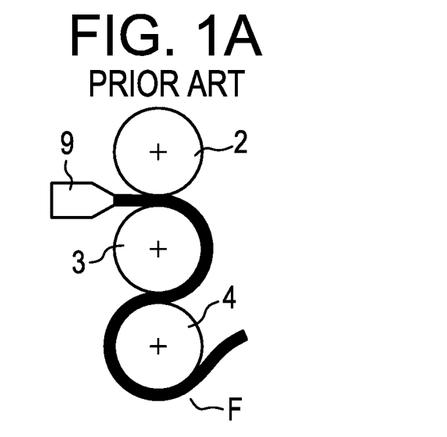
FIG. 1A is a schematic side view of a portion of a prior art vertical downstack polymer film casting system.
Figure 1B:
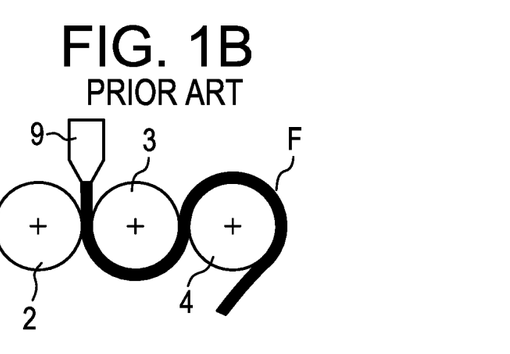
FIG. 1B is a schematic side view of a portion of a prior art horizontal polymer film casting system.
Figure 1C:
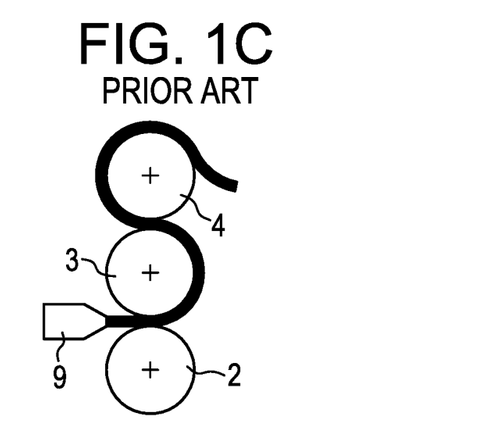
FIG. 1C is a schematic side view of a portion of a prior art vertical upstack polymer film casting system.

The position of the chill rolls with respect to one another have been oriented in various configurations. One polymer film casting configuration is the vertical down stack configuration shown in FIG. 1A where all of the chill rolls 2, 3 and 4 are oriented one on top of another along a common vertical axis. In the vertical down stack configuration the molten polymer film F is applied between the chill rolls 2 and 3 by a generally horizontal side mounted die 9 and fed downward from the chill roll 3 to the chill roll 4. Another polymer film casting configuration of FIG. 1B is the horizontal stack configuration shown in FIG. 1B where all of the chill rolls 2, 3 and 4 are oriented adjacent to one another along a horizontal axis. In the horizontal stack configuration the molten polymer film F is applied between the chill rolls 2 and 3 by a generally vertical top mounted die 9 and is fed from the chill roll 3 to the chill roll 4. Another polymer film casting configuration is the vertical upstack configuration shown in FIG. 1C where all of the chill rolls 2, 3 and 4 are oriented one on top of another along a common vertical axis. In the vertical upstack configuration the molten polymer film F is applied between the chill rolls 2 and 3 by a generally horizontal side mounted die 9 and fed upward from the chill roll 3 to the chill roll 4.

Figure 1D:
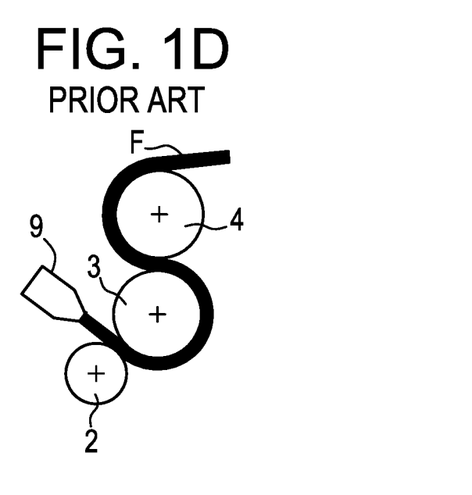
FIG. 1D is a schematic side view of a portion of a prior art offset vertical upstack polymer film casting system.
Figure 1E:
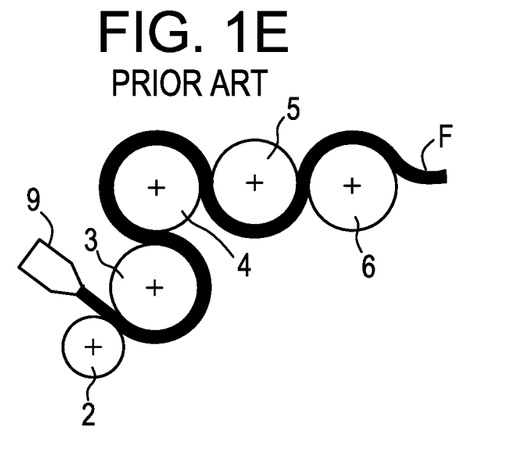
FIG. 1E is a schematic side view of a portion of a prior art offset vertical upstack polymer film casting system with additional horizontal chill rolls.
Figure 1F:
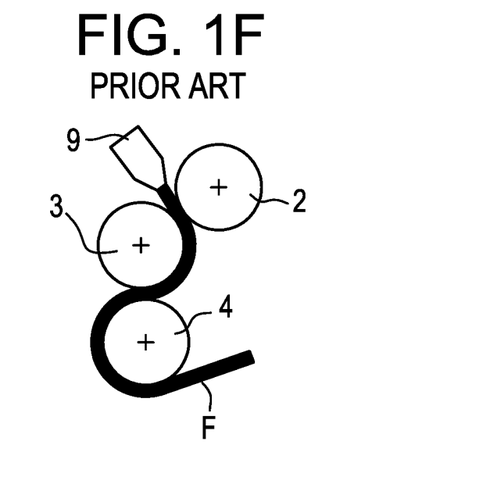
FIG. 1F is a schematic side view of a portion of a prior art offset vertical downstack polymer film casting system.

Further variations in the orientation of the die 9 have been used in the modified vertical upstack and down stack configurations. For example, as shown in FIG. 1D an offset vertical upstack configuration is shown with the chill roll 2 being offset horizontally from the vertically aligned chill rolls 3 and 4 and the die 9 is shown oriented at an angle relative to horizontal. FIG. 1E illustrates another vertical upstack configuration similar to that shown in FIG. 1D but with two additional chill rolls 5 and 6 aligned horizontally with the chill roll 4. FIG. 1F illustrates an offset vertical downstack with the die 9 is shown oriented at an angle relative to horizontal and the chill roll 2 is offset out of alignment with the vertically aligned chill rolls 3 and 4.

Figure 2:
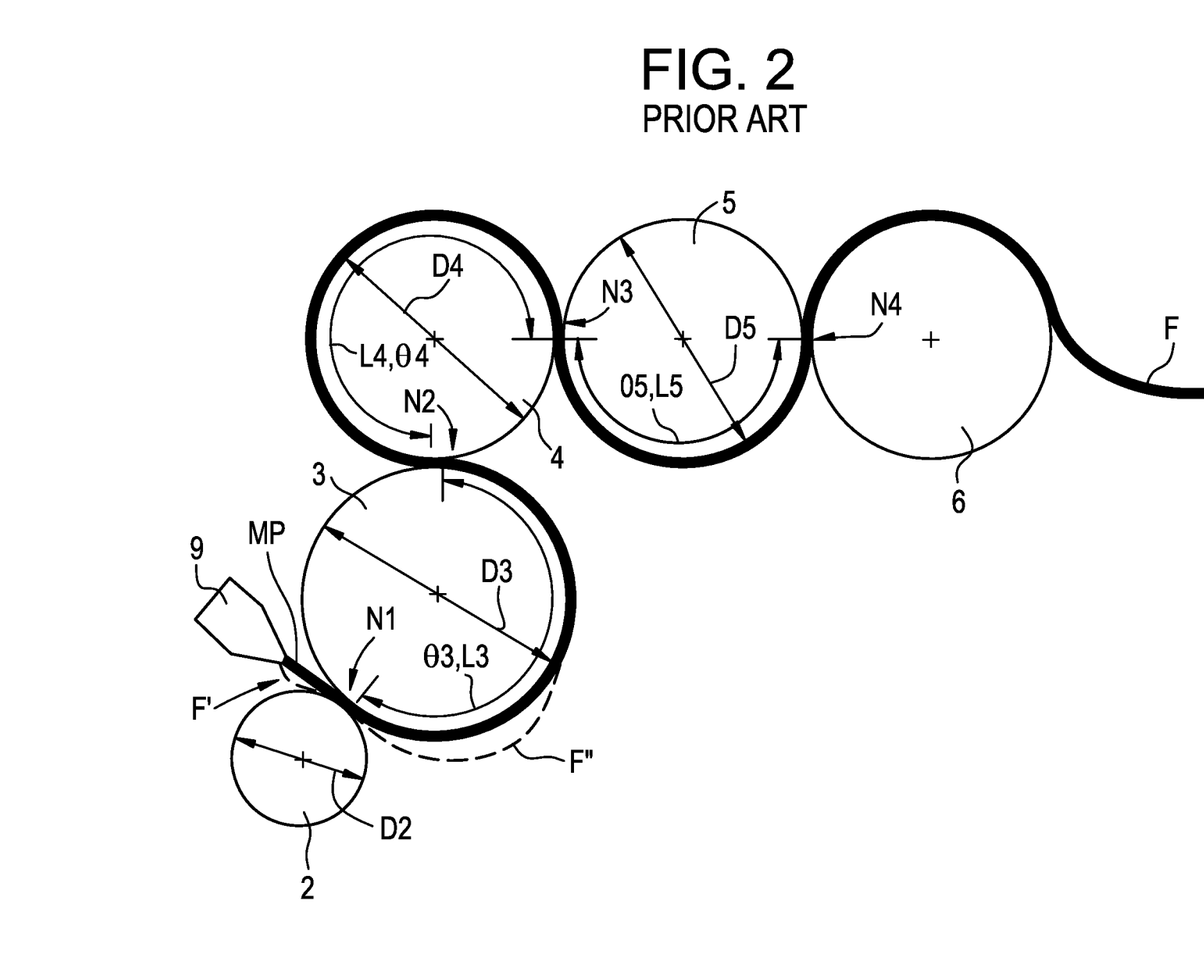
FIG. 2 is an enlarged view of the prior art offset vertical upstack polymer film casting system of FIG. 1E.

The configurations of FIGS. 1D, 1E and 1F all have the polymer film F applied to the chill roll 3 such that a portion of the polymer film F is located in proximity to a lower half (i.e., from a 3 o'clock to a 6 o'clock position) of the chill roll 3. As shown in FIG. 2, the molten polymer MP or polymer film F tends to sag due to the force of gravity as indicated by the dashed lines F' and F". Such sagging is particularly prevalent when low melt strength polymers are manufactured. The sagging of the molten polymer MP indicated by the dashed line F' tends to cause flutter, intermittent and premature contact of the molten polymer with the chill roll 2 before the molten polymer is sized in the nip N1. This premature contact can cause inconsistent and non-uniform sizing of the polymer film exiting the nip N1. The sagging of the polymer film indicated by the dashed line F'" can cause the polymer film to separate from and lose contact with the chill roll 3 and cause non-uniform cooling of the polymer film F prior to being sized in the nip N2.

It is known that the size (i.e., outside diameter) of the chill rolls 2, 3, 4, 5 and 6 and the location of the chill rolls and the nips N1, N2, N3 and N4 relative to one another establish the length L of contact on the respective chill roll. The length L of contact is determined by the equation $L=\pi D(\theta/360)$, where D is the outside diameter of the chill roll and $\theta$ is an arc angle between nips. Thus, the length of contact L3 of the polymer film F on the chill roll 3 is $\pi D3(\theta 3/360)$; the length of contact L4 of the polymer film F on the chill roll 4 is $\pi D4(\theta 4/360)$; and length of contact L5 of the polymer film F on the chill roll 5 is $\pi D5(\theta 5/360)$.

U.S. Pat. No. 9,616,606 discloses a device for sizing and cooling an extruded flat product made of plastic material that includes at least two main rolls and a polishing stack including a plurality of downstream rolls arranged one behind the other and disposed downstream of the at least two main rolls. The at least two main rolls and the downstream rolls have respective diameters such that a contact area between the flat product and the at least two main rolls and the downstream rolls is substantially the same on both sides of the flat product.

Based on the foregoing, there is an almost infinite number of different chill roll and die orientation configurations that control the contact length L depending on the magnitude of the outside diameters D3, D4, and D5, the location of the nips N1, N2, N3, N4 which determine the arc angles θ3, θ4 and θ5.

Thus, there is a need for chill roll and die configuration that addresses the foregoing problems.

SUMMARY OF THE INVENTION

There is disclosed herein a casting apparatus for manufacturing polymer film. The casting apparatus includes a die for discharging a molten polymer therefrom. The die has a discharge direction oriented at a non-zero discharge angle that is offset from a horizontal reference plane. The casting apparatus includes a pair of initial film receiving chill rolls, for example, a first chill roll that has a first diameter and a second chill roll that has a second diameter. The second diameter is greater than the first diameter. There is a first gap between the first chill roll and the second chill roll. The non-zero discharge angle of the discharge direction of the die is of a predetermined magnitude so as to gravity assist delivery of the molten polymer to the first gap. The second chill roll is positioned to gravity support the polymer film exiting the first gap along a first length of a first side of the polymer film. The casting apparatus includes a first polishing roll positioned downstream of the pair of initial film receiving chill rolls. The first polishing roll engages and cools a second length of a second side of the polymer film. The second side of the polymer film is opposite the first side. The first length is substantially equal to the second length In one embodiment, there is a second gap between the first polishing roll and the second chill roll. The first length of the polymer film extends along an exterior surface of the second chill roll, between the first gap and the second gap.

In one embodiment, the casting apparatus includes a second polishing roll positioned downstream of the first polishing roll. A third gap is located between the first polishing roll and the second polishing roll. The second length extends along an exterior surface of the first polishing roll, between the second gap and the third gap.

In one embodiment, the casting apparatus includes a third polishing roll positioned downstream of the second polishing roll. There is a fourth gap located between the second polishing roll and the third polishing roll. The first side of the polymer film engages and extends along an exterior surface of and a third length on the second polishing roll, between the third gap and the fourth gap.

In one embodiment, the second side of the polymer film engages and extends along an exterior surface of and a fourth length on the third polishing roll. In one embodiment, the first length, the second length and the third length are substantially equal. In one embodiment, the first length, the second length, the third length and the fourth length are substantially equal.

In one embodiment, the first length and the second length are established by relative positioning of the first chill roll, the second chill roll and/or the first polishing roll, for example, on a frame. In one embodiment, the first length, the second length, the third length and/or the fourth length are established by relative positioning of the first chill roll, the second chill roll, the first polishing roll, the second polishing roll and/or the third polishing roll, for example, on a frame.

In one embodiment, the first length and the second length are established by selection of the second diameter and a third diameter of the first polishing roll. In one embodiment, the third length and the fourth length are established by selection of a third diameter of the second polishing roll and a fourth diameter of the third polishing roll.

In one embodiment, at least two of the second chill roll, the first polishing roll, the second polishing roll and the third polishing roll are aligned along a common plane oriented at a non-zero tilt angle offset from the horizontal plane.

In one embodiment, the first chill roll and/or the second chill roll are rotationally mounted on a frame which includes a system for moving the frame relative to the die.

There is further disclosed herein a casting apparatus for manufacturing polymer film which includes a die for discharging a molten polymer. The die has a discharge direction oriented at a non-zero discharge angle offset from a horizontal reference plane. The casting apparatus includes a chill roll positioned downstream of the die. The casting apparatus includes a film displacement device positioned proximate to the chill roll. The film displacement device is configured to position the molten polymer on the chill roll and establish the thickness of the film on the chill roll. The non-zero discharge angle of the discharge direction of the die is of a predetermined magnitude to gravity assist delivery of the molten polymer to the chill roll. The chill roll is positioned to gravity support the polymer film along a first length of a first side of the polymer film. A polishing roll is positioned downstream of the chill roll. The polishing roll engages and cools a second length of a second side of the polymer film. The second side is opposite the first side. The first length is substantially equal to the second length In one embodiment, the film displacement device is a fluid impingement device such as an air jet or air knife. In one embodiment the film displacement device is a vacuum device.

DETAILED DESCRIPTION

Figure 3A:
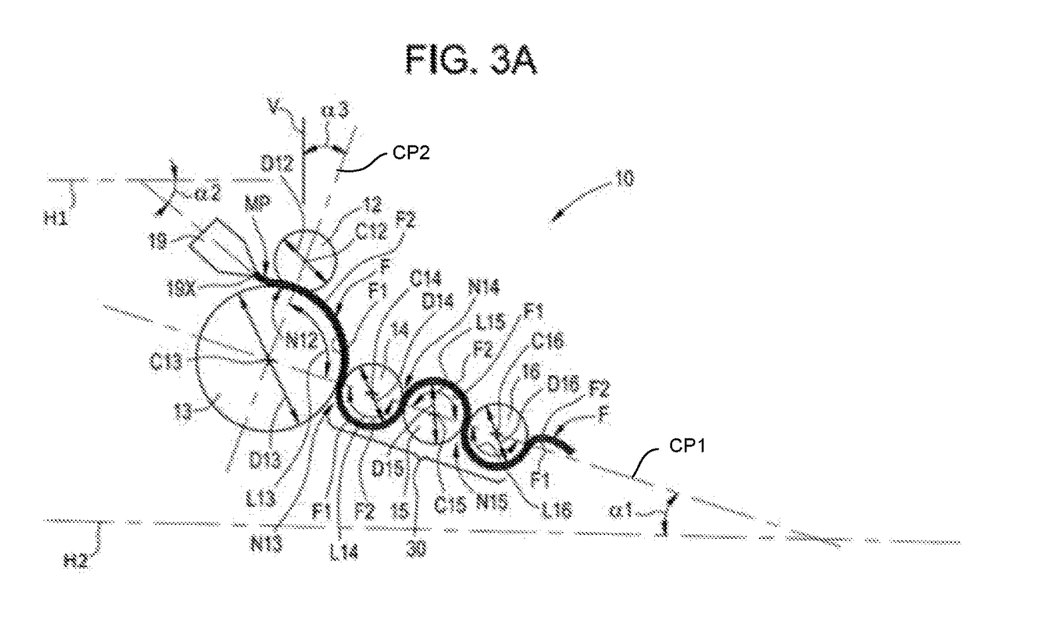
FIG. 3A is a schematic side view of a portion of a polymer film casting apparatus of the present invention.

As best shown in FIG. 3A, a casting apparatus for manufacturing polymer film is generally designated by the numeral 10. The casting apparatus 10 includes a die 19 for discharging a molten polymer MP. The die 19 is an elongate member that extends in a generally horizontal plane and is in communication with an extruder that supplies the molten polymer MP to the die 19. The die 19 has a discharge slit 19X and is oriented such that the discharge slit 19X has a discharge direction oriented at a non-zero discharge angle $\alpha 2$ that is offset from a first horizontal reference plane H1. In one embodiment, the non-zero discharge angle $\alpha 2$ is from 10 to 45 degrees.

Figure 4:
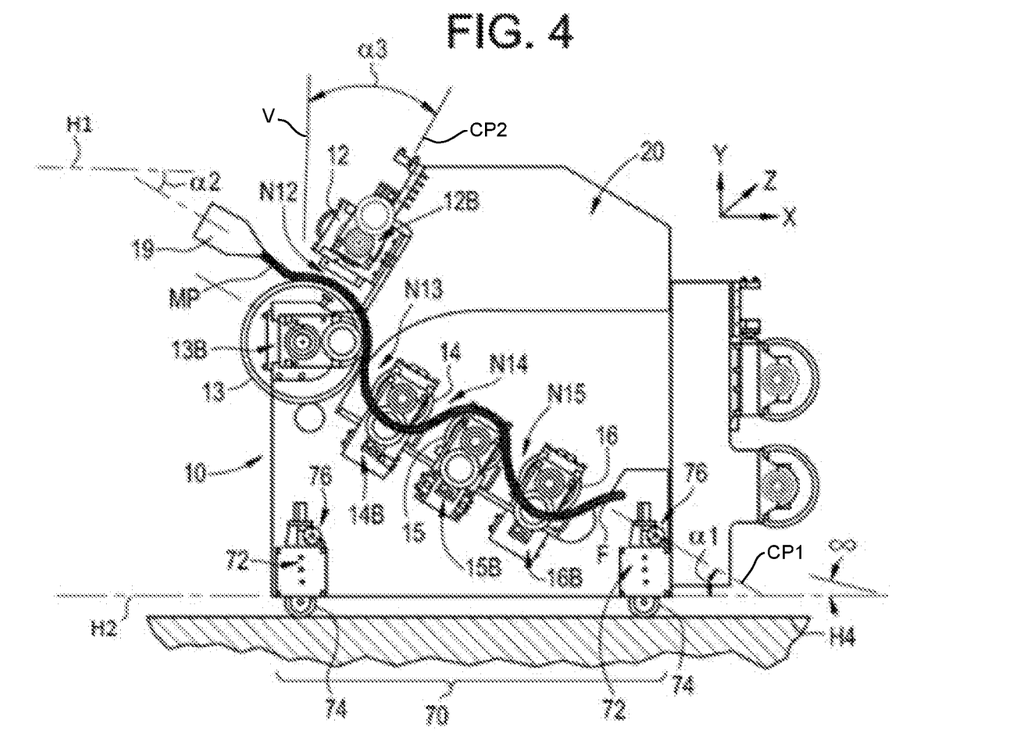
FIG. 4 is a side view of the polymer film casting apparatus of FIG. 3A shown installed in a frame in an open configuration.
Figure 5:
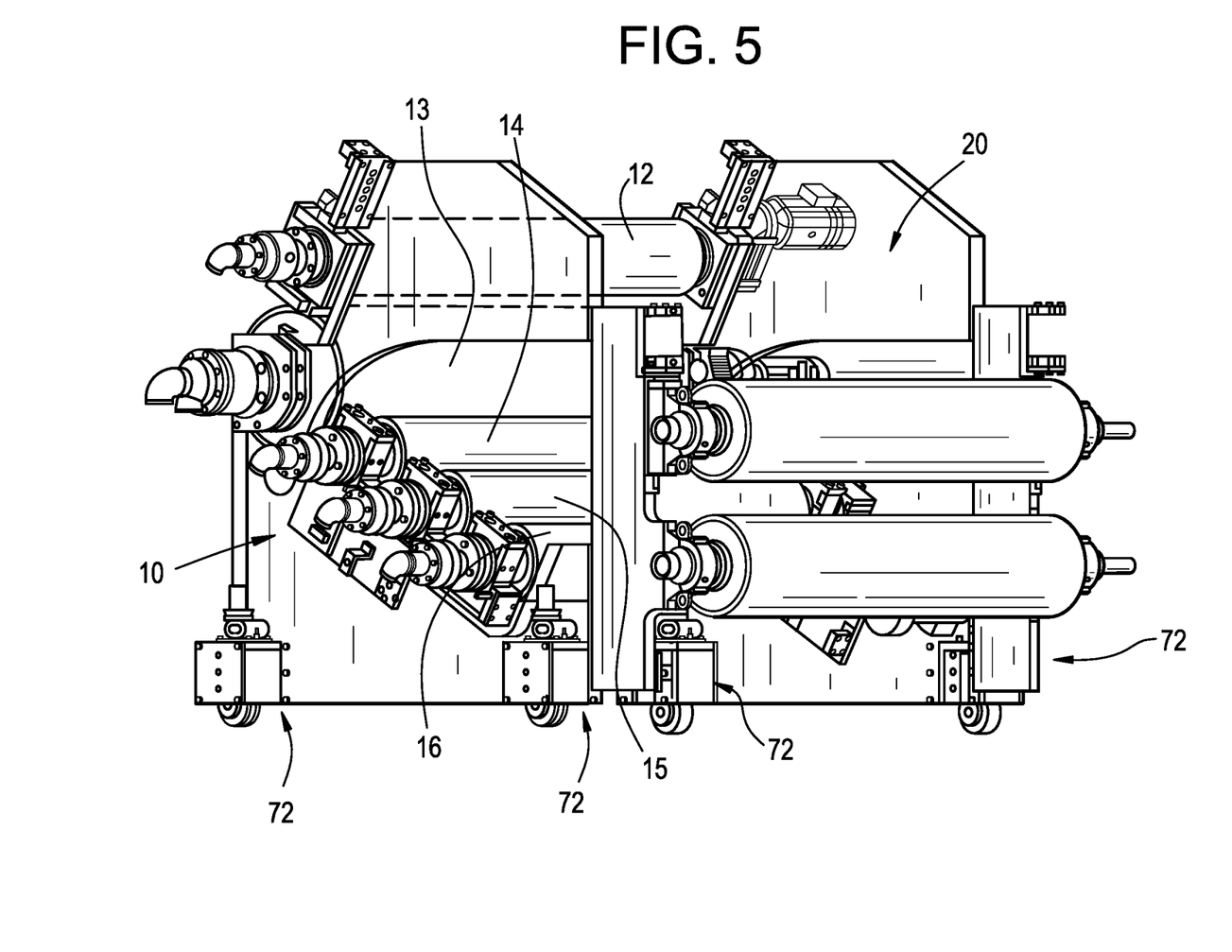
FIG. 5 is a perspective view of the polymer film casting apparatus of FIG. 4.
Figure 6:
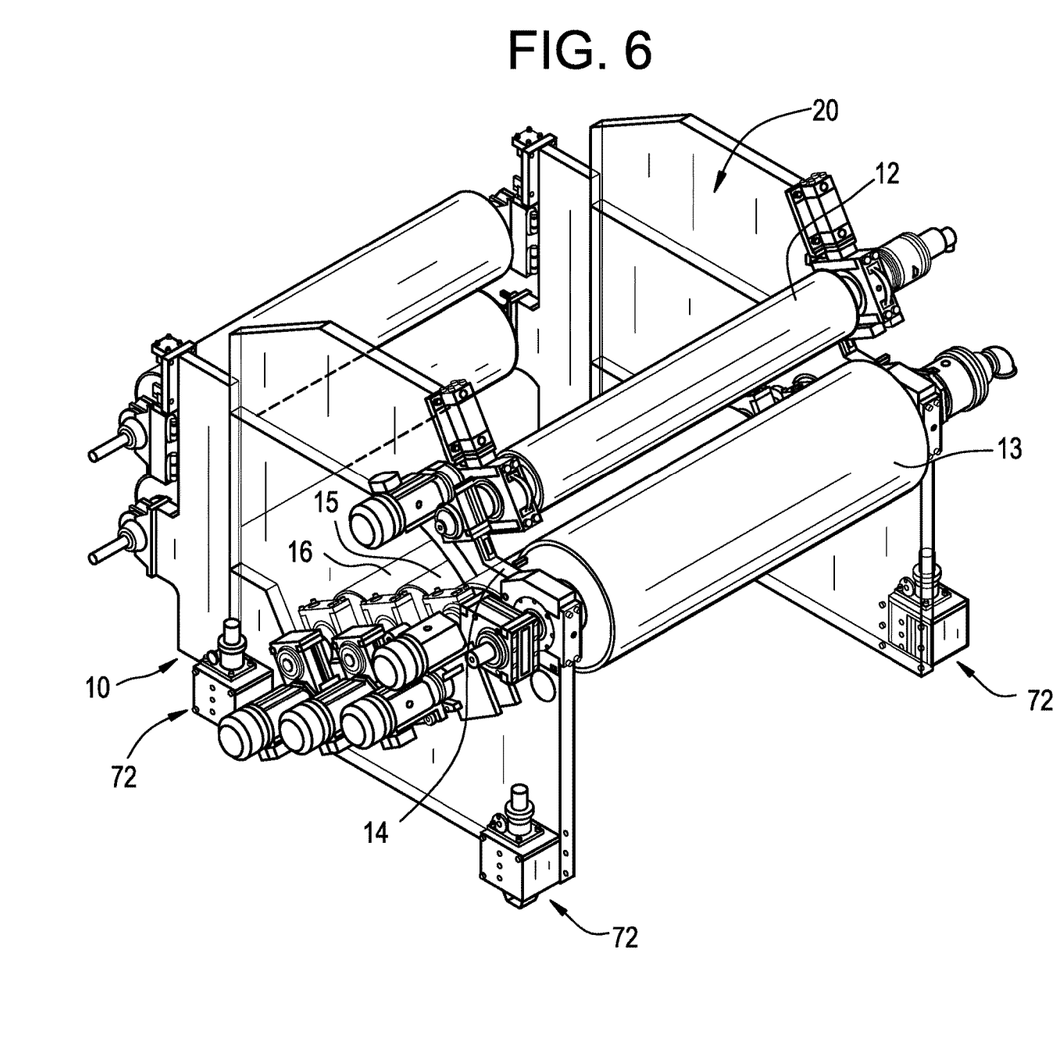
FIG. 6 is a rear perspective view of the polymer film casting apparatus of FIG. 5.

The casting apparatus 10 includes a pair of initial film receiving chill rolls (e.g., cylindrical rolls configured with a heat removal system), for example, a first chill roll 12 having a first diameter D12 and a second chill roll 13 having a second diameter D13. The second diameter D13 is greater than the first diameter D12. In one embodiment, the second diameter D13 is about two to three times greater than the first diameter D12. The first chill roll 12 and the second chill roll 13 are positioned downstream of the die 19. As shown in FIGS. 4-6, the first chill roll 12 and the second chill roll 13 are rotationally secured to a frame 20 (e.g., a roll stand) about respective center lines C12 and C13, by respective bracket and bearing assemblies 12B and 13B. The chill roll 12 is moveably mounted relative to the frame 20 to allow of adjustment of the position thereof relative to the second chill roll 13.

A first gap N12 is provided between the first chill roll 12 and the second chill roll 13. The first gap N12 is adjustable between a fully open position (e.g., as shown in FIG. 4 that is used during initial set up of the casting apparatus 10 and for maintenance) and during operation. During operation of the casting apparatus the gap N12 is reduced to a predetermined range of magnitudes to create a nip (e.g., a nip, adjustable during operation of the casting apparatus 10) for controlling the thickness of the molten polymer MP that cools into a polymer film F.

The non-zero discharge angle $\alpha 2$ of the discharge direction of the die 19 is of a predetermined magnitude to gravity assist delivery of the molten polymer MP to the first gap N12. For example, the discharge direction points downwardly at the non-zero discharge angle $\alpha 2$ to allow the force of gravity to urge the molten polymer into the gap N12 for sizing. Thus, employing the non-zero discharge angle $\alpha 2$ mitigates or eliminates the problems of the prior art polymer film casting devices, such as sagging of the molten polymer that can cause flutter, and intermittent and premature contact of the molten polymer with the chill roll 12, before sizing.

As shown in FIG. 3A, the second chill roll 13 is positioned to cool and gravity support the film F exiting the first gap N12 along a first length L13 of a first side F1 of the polymer film F. For example, the first side F1 of the first length L13 of the polymer film F, engages an exterior quadrant surface of the second chill roll 13 that is generally upward facing, from the 12 o'clock position (i.e., at the first gap N12) to the 3 o'clock position (i.e., at the second gap N13) on the second chill roll 13. Since the exterior quadrant surface of the second chill roll 13 is generally upward facing the first length L13 of the polymer film F tends to be pressed against the exterior quadrant surface by the force of gravity.

Figure 3B:
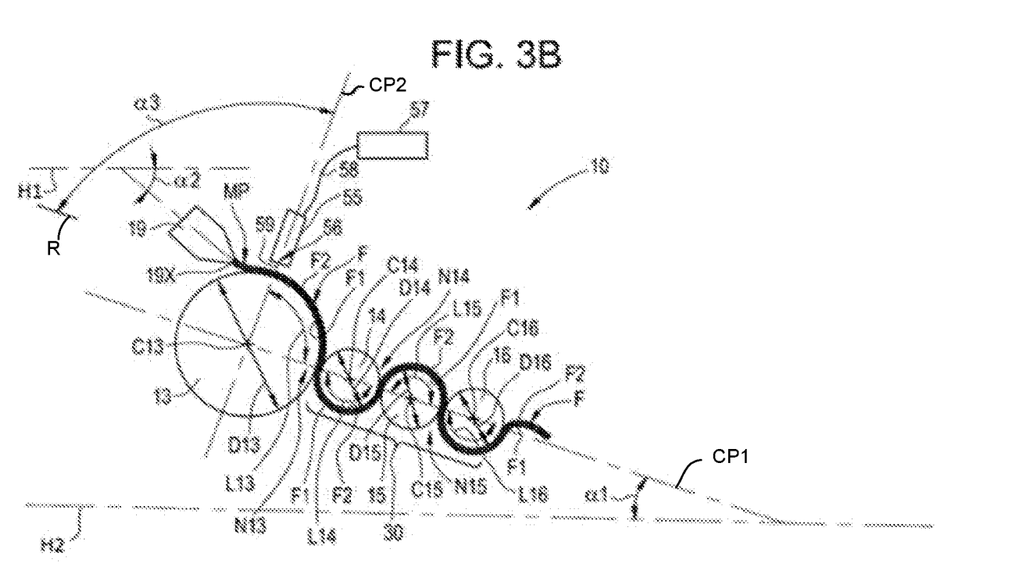
FIG. 3B is a schematic side view of a portion of a polymer film casting apparatus of the present invention having an air impingement device.

While the casting apparatus 10 is shown in FIG. 3A to include the first chill roll 12 and the second chill roll 13, the present invention is not limited in this regard as the first chill roll 12 may be eliminated and replaced with an film displacement device 55 (e.g., a vessel or box) that has an elongate discharge slit 56 therein. The second chill roll 13 and the film displacement device 55 are positioned downstream of the die 19. The die 19 and orientation thereof shown in FIG. 3B are configured similar to the die 19 shown in FIG. 3A. In one embodiment, the film displacement device 55 is a fluid impingement device (e.g., an air knife) that is in communication with a fluid supply source 57 (e.g., air compressor, air tank, nitrogen supply, liquid supply or pump) via a suitable conduit 58. A linear jet 59 is discharged from the slit 56 and impinges and controls and establishes the thickness, of the molten polymer MP that cools into a polymer film F on the second chill roll 13. The linear jet 59 controls and establishes the initial point of contact of the molten polymer on the second chill roll 13. The linear jet 59 is positioned so that the first length L13 is equal to the second length L14. In one embodiment, the first length L13, the second length L14 and the third length L15 are substantially equal. In one embodiment, the first length L13, the second length L14, the third length L15 and the fourth length L16 are substantially equal.

Figure 3C:
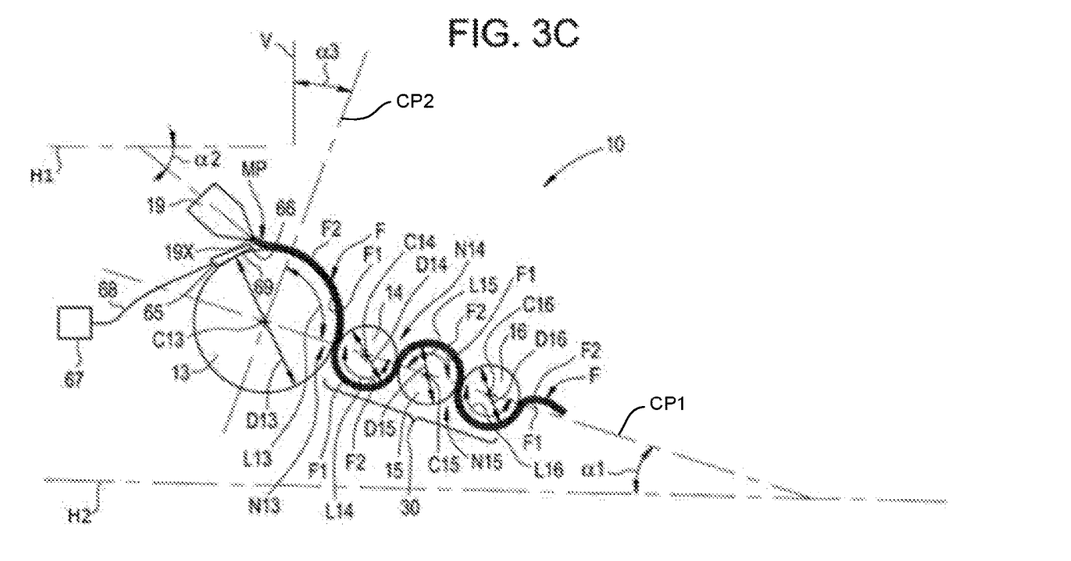
FIG. 3C is a schematic side view of a portion of a polymer film casting apparatus of the present invention having a vacuum device.

While the film displacement device 55 of FIG. 3B is shown and described as being the fluid impingement device (e.g., an air knife) that is in communication with the fluid supply source 57 (e.g., air compressor, air tank, nitrogen supply, liquid supply or pump) via the suitable conduit 58, the present invention is not limited in this regard as other configurations may be employed. For example, as shown in FIG. 3C, the first chill roll 12 may be eliminated and replaced with a film displacement device 65 (e.g., a vessel or box) that has an elongate discharge slit 66 therein. The second chill roll 13 and the film displacement device 65 are positioned downstream of the die 19. The die 19 and orientation thereof shown in FIG. 3C are configured similar to the die 19 shown in FIG. 3A. In one embodiment, the film displacement device 65 is a vacuum device (e.g., a vacuum chamber) that is in communication with a vacuum source 67 (e.g., vacuum pump) via a suitable conduit 68. A linear jet 69 is suctioned into the slit 66 and controls and establishes the thickness of the molten polymer MP that cools into a polymer film F on the second chill roll 13. The linear jet 69 controls and establishes the initial point of contact of the molten polymer on the second chill roll 13 by pulling the film onto the second chill roll 13. The linear jet 69 is positioned so that the first length L13 is equal to the second length L14. In one embodiment, the first length L13, the second length L14 and the third length L15 are substantially equal. In one embodiment, the first length L13, the second length L14, the third length L15 and the fourth length L16 are substantially equal.

A polishing stage 30 is positioned downstream of the pair of initial film receiving chill rolls 12 and 13. The polishing stage 30 (e.g., cylindrical rolls configured with a heat removal system) is employed to further cool, size and uniformly finish the polymer film F. The polishing stage 30 includes a first polishing roll 14 positioned downstream of the pair of initial film receiving chill rolls 12 and 13. A second gap N13 (e.g., a nip, adjustable during operation of the casting apparatus 10) is located between the first polishing roll 14 and the second chill roll 13. The polishing stage 30 includes a second polishing roll 15 positioned downstream of the first polishing roll 14. A third gap N14 is located between the first polishing roll 14 and the second polishing roll 15. The polishing stage 30 includes a third polishing roll 16 positioned downstream of the second polishing roll 15. A fourth gap N15 (e.g., a nip, adjustable during operation of the casting apparatus 10) is located between the second polishing roll 15 and the third polishing roll 16. As shown in FIGS. 4-6, the first polishing roll 14, the second polishing roll 15 and the third polishing roll 16 are rotatably mounted to the frame 20, about respective center lines C14, C15 and C16, by respective bracket and bearing assemblies 14B, 15B and 16B.

The first polishing roll 14, the second polishing roll 15 and the third polishing roll 16 are moveably mounted to the frame 20 to allow of adjustment of the position thereof relative to each other and the second chill roll 13. The movability of the first polishing roll 14, the second polishing roll 15 and the third polishing roll 16 allows for adjustment of the size of the gaps N13, N14 and N15 to create respective nips at each gap N13, N14 and N15 for controlling the thickness of the polymer film F, during operation of the casting apparatus 10.

While the polishing stage 30 is shown and described as having the first polishing roll 14, the second polishing roll 15 and the third polishing roll 16, the present invention is not limited in this regard as more or less polishing rolls may be employed.

As best shown in FIG. 3A, the second chill roll 13, the first polishing roll 14, the second polishing roll 15 and the third polishing roll 16 are aligned along a first common plane CP1 oriented at a non-zero tilt angle $\alpha 1$ offset from the second horizontal plane H2, which is parallel to the first horizontal plane H1. In one embodiment, the non-zero tilt angle $\alpha 1$ is from 45 to 10 degrees. The first chill roll 12 and the second chill roll 13 are aligned along a second common plane CP2 that is oriented at a non-zero tilt angle $\alpha 3$ offset from a vertical plane V. In one embodiment, the non-zero tilt angle $\alpha 3$ is from 10 to 45 degrees.

As shown in FIG. 3B, the linear jet 59 and/or the film displacement device 55 and the second chill roll 13 are aligned along the second common plane CP2 that is oriented at a non-zero tilt angle $\alpha 3$ offset from a reference plane R. In one embodiment, the non-zero tilt angle $\alpha 3$ is from 10 to 45 measured clockwise from the reference plane R. In one embodiment, the non-zero tilt angle $\alpha 3$ is 0 to 90 degrees measured clockwise from the reference plane R.

As shown in FIG. 3A, the first polishing roll 14 engages and cools a second length L14 of a second side F2 of the polymer film F. The second side F2 is opposite the first side F1. The first length L13 is substantially equal to the second length L14. The first length L13 extends along an exterior surface of the second chill roll 13, between the first gap N12 and the second gap N13. The second length L14 extends along an exterior surface of the first polishing roll 14, between the second gap N13 and the third gap N14. The first side F1 of the polymer film F engages and extends a third length L15 on an exterior surface of the second polishing roll 15, between the third gap N14 and the fourth gap N15. The second side F2 of the polymer film F engages and extends a fourth length L16 on an exterior surface of the third polishing roll 16 between the fourth gap N15 and a line located opposite the fourth gap N15 (e.g., about 180 degrees around the third polishing roll 16). The location of the line located opposite the fourth gap N15 is determined by the angle of discharge of the polymer film F from the third polishing roll 16.

In one embodiment, the first length L13, the second length L14 and the third length L15 are substantially equal. In one embodiment, the first length L13, the second length L14, the third length L15 and the fourth length L16 are substantially equal. In one embodiment, the first length L13 and the second length L14 are established by relative positioning (e.g., positioning the rolls relative to one another) of the first chill roll 12, the second chill roll 13 and/or the first polishing roll 14. In one embodiment, the first length L13, the second length L14, the third length L15 and the fourth length L16 are established by relative positioning of the first chill roll 12, the second chill roll 13, the first polishing roll 14, the second polishing roll 15 and the third polishing roll 16.

In one embodiment, the first length L13 is established by the second diameter D13 of the second chill roll 13. In one embodiment, the second length L14 is established by the third diameter D14 of the first polishing roll 14. In one embodiment, the third length L15 is established by a fourth diameter D15 of the second polishing roll 15. The fourth length L16 is established by the fifth diameter D16 of the third polishing roll 16.

As shown in FIG. 4, the frame 20 includes a system 70 for vertical movement of the frame along an axis Y; horizontal movement of the frame 20 along an axis X, horizontal movement along an axis Z and angular movement co of the second horizontal plane H2 of the frame 20 relative to a base H4. The system 70 includes a set of roller jacks 72 (e.g., two shown in FIG. 4, and four shown in FIG. 5). Each of the roller jacks 72 has a roller device 74 rotationally secured thereto and a jacking device positioned to adjust the vertical position of the frame 20. The system 70 is configured to move the frame 20 relative to the die 19 to adjust the distance and angle of the frame 20, second chill roll 13 and first chill roll 12 relative to the die 19. The system 70 may also be employed to adjust the distance and angle co of the frame 20, second chill roll 13 and film displacement device 55 and 65 (FIGS. 3B and 3C) relative to the die 19. The system 70 is operational and employed during setup of the casting apparatus 10 and the processing of the film during operation of the casting apparatus 10.

Although the present invention has been disclosed and described with reference to certain embodiments thereof, it should be noted that other variations and modifications may be made, and it is intended that the following claims cover the variations and modifications within the true scope of the invention.

What is claimed is:

1. A casting apparatus for manufacturing polymer film, the casting apparatus comprising:
    a die for discharging a molten polymer, the die having a discharge direction oriented at a non-zero discharge angle offset from a first horizontal reference plane;
    a pair of initial film receiving chill rolls comprising a first chill roll having a first diameter and a second chill roll having a second diameter, the second diameter being greater than the first diameter, and a first gap between the first chill roll and the second chill roll;
    the non-zero discharge angle of the discharge direction of the die being of a predetermined magnitude to gravity assist delivery of the molten polymer to the first gap;
    a first polishing roll positioned downstream of the pair of initial film receiving chill rolls, a second gap between the first polishing roll and the second chill roll, a first length of a first side of the polymer film extending from the first gap to the second gap along an outer circumferential surface of the second chill roll, and the first polishing roll engaging and cooling a second length of a second side of the polymer film, the second side being opposite the first side;
    the second length extending from the second gap along an outer circumferential surface of the first polishing roll such that the first length is substantially equal to the second length; and
    the second chill roll positioned to gravity support and be in constant contact with the polymer film exiting the first gap entirely along the first length.

2. The casting apparatus of claim 1, further comprising a second polishing roll positioned downstream of the first polishing roll, a third gap between the first polishing roll and the second polishing roll, the second length extending from the second gap to the third gap.

3. The casting apparatus of claim 2, further comprising a third polishing roll positioned downstream of the second polishing roll, a fourth gap between the second polishing roll and the third polishing roll, the first side of the polymer film engaging and extending a third length on the second polishing roll, the third length extending from the third gap to the fourth gap.

4. The casting apparatus of claim 3, wherein the second side of the polymer film engages and extends a fourth length on the third polishing roll.

5. The casting apparatus of claim 3, wherein the first length, the second length and the third length are substantially equal.

6. The casting apparatus of claim 4, wherein the first length, the second length, the third length and the fourth length are substantially equal.

7. The casting apparatus of claim 3, wherein the first length and the second length are established by positioning at least one of the first chill roll, the second chill roll and the first polishing roll, relative to one another.

8. The casting apparatus of claim 3, wherein the first length, the second length, the third length and the fourth length are established by positioning at least one of the first chill roll, the second chill roll, the first polishing roll, the second polishing roll and the third polishing roll, relative to one another.

9. The casting apparatus of claim 3, wherein the first length is a mathematical function of the second diameter of the second chill roll and the second length is a mathematical function of a third diameter of the first polishing roll.

10. The casting apparatus of claim 4, wherein the fourth length extends on an exterior surface of the third polishing roll from the fourth gap such that the fourth length is substantially equal to the third length.

11. The casting apparatus of claim 3, wherein the second chill roll and at least two of the first polishing roll, the second polishing roll and the third polishing roll are aligned along a first common plane oriented at a non-zero tilt angle offset from a second horizontal reference plane, wherein the second horizontal reference plane is parallel to the first horizontal reference plane and the first common plane slopes downward from the second chill roll in a direction of film processing.

12. The casting apparatus of claim 4, wherein at least one of the first chill roll and the second chill roll are rotationally mounted on a frame and the frame comprises a system for moving the frame relative to the die.

13. A casting apparatus for manufacturing polymer film, the casting apparatus comprising:
a die for discharging a molten polymer, the die having a discharge direction oriented at a non-zero discharge angle offset from a first horizontal reference plane;
a pair of initial film receiving chill rolls comprising a first chill roll having a first diameter and a second chill roll having a second diameter, the second diameter being greater than the first diameter, and a first gap between the first chill roll and the second chill roll;
the non-zero discharge angle of the discharge direction of the die being of a predetermined magnitude to gravity assist delivery of the molten polymer to the first gap;
a first polishing roll positioned downstream of the pair of initial film receiving chill rolls, a second gap between the first polishing roll and the second chill roll, a first length of a first side of the polymer film extending from the first gap to the second gap along an outer circumferential surface of the second chill roll, and the first polishing roll engaging and cooling a second length of a second side of the polymer film, the second side being opposite the first side;
the second length extending from the second gap along an outer circumferential surface of the first polishing roll such that the first length is substantially equal to the second length;
the second chill roll positioned to gravity support and be in constant contact with the polymer film exiting the first gap entirely along the first length,
a second polishing roll positioned downstream of the first polishing roll, a third gap between the first polishing roll and the second polishing roll, the second length extending from the second gap to the third gap;
a third polishing roll positioned downstream of the second polishing roll, a fourth gap between the second polishing roll and the third polishing roll, the first side of the polymer film engaging and extending a third length on the second polishing roll, the third length extending from the third gap to the fourth gap;
the second chill roll and at least two of the first polishing roll, the second polishing roll, and the third polishing roll are fixed along and aligned along a first common plane oriented at a first non-zero tilt angle offset from a second horizontal reference plane, wherein the second horizontal reference plane is parallel to the first horizontal reference plane and the first common plane slopes downward from the second chill roll in a direction of film processing.

14. The casting apparatus of claim 13, wherein the second side of the polymer film engages and extends a fourth length on the third polishing roll.

15. The casting apparatus of claim 13, wherein the first length, the second length, and the third length are substantially equal.

16. The casting apparatus of claim 14, wherein the first length, the second length, the third length, and the fourth length are substantially equal.

17. The casting apparatus of claim 13, wherein the first length and the second length are established by positioning at least one of the first chill roll, the second chill roll, and the first polishing roll, relative to one another.

18. The casting apparatus of claim 13, wherein the first length, the second length, the third length, and a fourth length are established by positioning at least one of the first chill roll, the second chill roll, the first polishing roll, the second polishing roll, and the third polishing roll, relative to one another.

19. The casting apparatus of claim 13, wherein the first length is a mathematical function of the second diameter of the second chill roll and the second length is a mathematical function of a third diameter of the first polishing roll.

20. The casting apparatus of claim 14, wherein the fourth length extends on an exterior surface of the third polishing roll from the fourth gap such that the fourth length is substantially equal to the third length.

21. The casting apparatus of claim 14, wherein at least one of the first chill roll and the second chill roll are rotationally mounted on a frame and the frame comprises a system for moving the frame relative to the die.

22. The casting apparatus of claim 13, wherein the first chill roll and the second chill roll are aligned along a second common plane oriented at a second non-zero tilt angle offset from a vertical plane, wherein the second common plane of the first chill roll and the second chill roll being perpendicular to the first common plane of the second chill roll and at least two of the first polishing roll, the second polishing roll, and the third polishing roll.

23. A casting apparatus for manufacturing polymer film, the casting apparatus comprising:
   a die for discharging a molten polymer, the die having a discharge direction oriented at a non-zero discharge angle offset from a first horizontal reference plane;
   a pair of initial film receiving chill rolls comprising a first chill roll having a first diameter and a second chill roll having a second diameter, the second diameter being greater than the first diameter, and a first gap between the first chill roll and the second chill roll;
   the non-zero discharge angle of the discharge direction of the die being of a predetermined magnitude to gravity assist delivery of the molten polymer to the first gap;
   a first polishing roll positioned downstream of the pair of initial film receiving chill rolls, a second gap between the first polishing roll and the second chill roll, a first length of a first side of the polymer film extending from the first gap to the second gap along an outer circumferential surface of the second chill roll, and the first polishing roll engaging and cooling a second length of a second side of the polymer film, the second side being opposite the first side;
   the second length extending from the second gap along an outer circumferential surface of the first polishing roll such that the first length is substantially equal to the second length;
   the second chill roll positioned to gravity support and be in constant contact with the polymer film exiting the first gap entirely along the first length;
   the second chill roll and the first polishing roll are aligned along a first common plane oriented at a first non-zero tilt angle offset from a second horizontal reference plane, the second horizontal reference plane is parallel to the first horizontal reference plane;
   the first chill roll and the second chill roll are aligned along a second common plane oriented at a second non-zero tilt angle offset from a vertical plane; and
   the second common plane of the first chill roll and the second chill roll being perpendicular to the first common plane of the second chill roll and the first polishing roll.

24. The casting apparatus of claim 23, further comprising a second polishing roll positioned downstream of the first polishing roll, a third gap between the first polishing roll and the second polishing roll, the second length extending from the second gap to the third gap.

25. The casting apparatus of claim 24, further comprising a third polishing roll positioned downstream of the second polishing roll, a fourth gap between the second polishing roll and the third polishing roll, the first side of the polymer film engaging and extending a third length on the second polishing roll, the third length extending from the third gap and to the fourth gap.

26. The casting apparatus of claim 25, wherein the second side of the polymer film engages and extends a fourth length on the third polishing roll.

27. The casting apparatus of claim 25, wherein the first length, the second length and the third length are substantially equal.

28. The casting apparatus of claim 26, wherein the first length, the second length, the third length and the fourth length are substantially equal.

29. The casting apparatus of claim 25, wherein the first length and the second length are established by positioning at least one of the first chill roll, the second chill roll and the first polishing roll, relative to one another.

30. The casting apparatus of claim 25, wherein the first length, the second length, the third length, and a fourth length are established by positioning at least one of the first chill roll, the second chill roll, the first polishing roll, the second polishing roll, and the third polishing roll, relative to one another.

31. The casting apparatus of claim 25, wherein the first length is a mathematical function of the second diameter of the second chill roll and the second length is a mathematical function of a third diameter of the first polishing roll.

32. The casting apparatus of claim 26, wherein the fourth length extends on an exterior surface of the third polishing roll from the fourth gap such that the fourth length is substantially equal to the third length.

33. The casting apparatus of claim 25, wherein the second chill roll, the first polishing roll, and at least one of the second polishing roll and the third polishing roll are aligned along the first common plane oriented at the first non-zero tilt angle offset from the second horizontal reference plane, wherein the first common plane slopes downward from the second chill roll in a direction of film processing.

34. The casting apparatus of claim 26, wherein at least one of the first chill roll and the second chill roll are rotationally mounted on a frame and the frame comprises a system for moving the frame relative to the die.

* * * * *